(12) United States Patent
Konijn (10) Patent No.: US 7,841,585 B2
(45) Date of Patent: Nov. 30, 2010

(54) SEPARATION TRAY

(75) Inventor: Gerrit Konijn, Amsterdam (NL)

(73) Assignee: Shell Oil Company, Houston, TX (US)

( * ) Notice: Subject to any disclaimer, the term of this patent is extended or adjusted under 35 U.S.C. 154(b) by 26 days.

(21) Appl. No.: 10/779,988

(22) Filed: Feb. 17, 2004

(65) Prior Publication Data
US 2004/0195706 A1    Oct. 7, 2004

(30) Foreign Application Priority Data
Feb. 21, 2003    (EP) .................................. 03075502

(51) Int. Cl.
*B01F 3/04*    (2006.01)
(52) U.S. Cl. .................... 261/79.2; 55/347; 55/348; 55/452
(58) Field of Classification Search ................. 261/79.2, 261/114.1; 55/347, 348, 452
See application file for complete search history.

(56) References Cited

U.S. PATENT DOCUMENTS

| | | | |
|---|---|---|---|
| 2,560,077 A | 7/1951 | Bloomer et al. ............... 183/21 |
| 4,349,360 A * | 9/1982 | Schuurmans et al. .......... 96/311 |
| 4,566,883 A * | 1/1986 | Paardekooper et al. ........ 55/329 |
| 4,591,367 A * | 5/1986 | Pek et al. ...................... 55/344 |
| 4,767,424 A | 8/1988 | McEwan ...................... 55/184 |
| 4,880,451 A * | 11/1989 | Konijn ........................ 96/306 |
| 5,300,132 A * | 4/1994 | Konijn ........................ 96/306 |
| 5,626,799 A * | 5/1997 | Sheinman .................. 261/79.2 |
| 5,683,629 A | 11/1997 | Konijn ...................... 261/79.2 |
| 5,885,488 A | 3/1999 | Konijn ...................... 261/79.2 |
| 5,972,171 A | 10/1999 | Ross et al. ..................... 203/40 |
| 6,227,524 B1 | 5/2001 | Kiselev et al. ............. 261/79.2 |
| 2005/0183325 A1 | 8/2005 | Sutkowski ................... 44/418 |
| 2006/0156620 A1 | 7/2006 | Clayton ...................... 44/457 |

FOREIGN PATENT DOCUMENTS

| | | |
|---|---|---|
| DE | 109804 | 11/1974 |
| DE | 38 32 420 A1 | 4/1990 |
| EP | 0048508 A2 | 8/1981 |
| EP | 0083811 A1 | 11/1982 |
| EP | 0331247 | 2/1989 |
| EP | 0924022 A2 | 6/1999 |
| EP | 1408101 A1 | 4/2004 |
| GB | 1119699 | 7/1968 |
| WO | WO0188064 A2 | 11/2001 |
| WO | 02/34350 | 5/2002 |

OTHER PUBLICATIONS

European Search Report of May 20, 2003.
International Preliminary Report on Patentability of Jun. 20, 2005.

* cited by examiner

*Primary Examiner*—Scott Bushey
(74) *Attorney, Agent, or Firm*—Charles W. Stewart (57) ABSTRACT

A separation tray, suitable for mounting in a vertical column, for separating liquid/gas mixtures. The separation tray has horizontal upper and lower walls and a plurality of primary separation devices for separating a fluid into a primary gas and a liquid-enriched secondary gas. The invention is characterized by a secondary separation zone located in the inner free space between the upper and lower walls and the primary separation devices. Liquid-enriched secondary gas is removed through outlets in the primary separation devices and guided downwardly by return skirts into the inner free space, whereupon the entrained liquid in the liquid-enriched secondary gas is substantially removed from the secondary gas.

17 Claims, 4 Drawing Sheets

SEPARATION TRAY

The present invention relates to a separation tray suitable for being horizontally mounted in a normally vertical column. The column can in particular be a column suitable for separating liquid/gas mixtures.

In the specification and in the claims the term gas shall be used so as to also include vapour.

European Patent Specification No. 0 083 811 B1 discloses a separation tray comprising a normally horizontal upper wall and a normally horizontal lower wall defining an inner space between them; means for admitting fluid to the inner space; means for removing liquid from the inner space; means for removing gas from the inner space; a plurality of primary separation devices for separating fluid into primary gas and liquid-enriched fluid, each primary separation device being arranged within the inner space and comprising:

a normally vertical conduit having at its lower end an inlet for fluid, which inlet is in fluid communication with the means for admitting fluid, and having at its upper end an outlet for primary gas, which outlet is in fluid communication with the means for removing gas;

a swirl-imparting means arranged in the conduit between the inlet for fluid and the outlet for gas, so as to cause, during normal operation, the formation of a layer of liquid-enriched fluid in the annular region adjacent the inner surface of the conduit downstream of the swirl-imparting means; and a means for removing and guiding at least part of the liquid-enriched fluid from the primary separation device to a secondary separation means for removing entrained liquid from secondary gas.

During normal operation of the known separation tray when it is mounted in a column, fluid comprising liquid and gas is admitted through openings in the lower tray, to enter the primary separation means, which are also referred to as swirl tubes.

During normal operation the swirl tubes perform a primary separation of the gas/liquid mixture. To this end, the swirl-imparting means in the form of a vane assembly imparts a rotary movement to the gas/liquid mixture, and by this rotary movement the liquid droplets of the gas/liquid mixture are flung outwardly to impinge and coalesce on the inner surface of the tubular wall.

The major part of the gaseous components of the gas/liquid mixture supplied into each swirl tube is discharged via a co-axial primary gas outlet tube to a position above the upper wall.

In an annular region at the inner wall of the swirl tube a streaming layer of liquid-enriched fluid is formed by liquid and a smaller part of the gaseous components, the so-called secondary gas. In particular, a layer of bulk liquid can be formed on the inner surface of the tubular wall. The liquid passes, together with the secondary gas, partly in transverse or slightly upward direction through discharge openings in the tubular wall, and partly through a fluid passage at the upper end of the swirl tube. In the free inner space, bulk liquid settles out and accumulates on top of the lower tray wall, from where it is removed via an outlet in the side wall of the column. The expression free inner space is used in the description and in the claims to refer to the part of the inner space between upper and lower walls, outside of any primary separation devices, swirl tubes or other conduits, and in particular outside of the means for removing and guiding liquid-enriched fluid from the primary to the secondary separation device(s). Secondary gas leaves the free inner space through outlets in the upper wall.

Under typical operation conditions wherein liquid loads and/or flow velocities in the swirl tube are maximised, liquid is entrained in the secondary gas leaving the free inner space. Secondary gas is therefore often wetter than primary gas, and it is needed to further dry the secondary gas in a secondary separation means. In the known separation tray, the secondary gas which upwardly leaves the free inner space is guided by conduits to the secondary separation means so as to separate entrained liquid therefrom.

In one embodiment of the known separation tray, the secondary separation means for removing entrained liquid from secondary gas is formed by filter means arranged above the upper wall. The liquid separated by the filter means is discharged through a separate side outlet in the column wall. The dried secondary gas stream is then united with the primary gas stream above the secondary separation means.

In an alternative embodiment, the known separation tray comprises a secondary separation means in the form of a special swirl tube. Secondary gas is collected in a secondary gas-collecting space above the upper wall, and is guided through a conduit to below the lower wall to be upwardly admitted into the special swirl tube.

It is an object of the present invention to provide a separation tray which is more compact than the known separation tray, and easier to manufacture.

The present invention provides a separation tray suitable for being horizontally mounted in a normally vertical column, which separation tray comprises a normally horizontal upper wall and a normally horizontal lower wall defining an inner space between them; a means for admitting fluid to the inner space; a means for removing liquid from the inner space; a means for removing gas from the inner space; at least one primary separation device within the inner space, for separating fluid into primary gas and liquid-enriched fluid, which primary separation device comprises:

a normally vertical tubular conduit having at its lower end an inlet for fluid, which inlet is in fluid communication with the means for admitting fluid, and having at its upper end an outlet for primary gas, from which outlet an outlet conduit extends to a primary gas outlet opening in the upper wall, which primary gas outlet opening forms part of the means for removing gas;

a swirl-imparting means arranged in the conduit between the inlet for fluid and the outlet for primary gas, so as to cause, during normal operation, the formation of a layer of liquid-enriched fluid in an annular region adjacent the inner surface of the conduit downstream of the swirl-imparting means, which liquid-enriched fluid comprises secondary gas;

and which separation tray further comprises a means for removing and guiding liquid-enriched fluid from the primary separation device to a secondary separation means for removing entrained liquid from secondary gas, wherein the secondary separation means for removing entrained liquid from secondary gas is formed by the free inner space between the upper and lower walls, which free inner space has in its lower part an outlet for liquid in fluid communication with the means for removing liquid and in its upper part an outlet for secondary gas, which extends to a secondary gas outlet opening in the upper wall, which secondary gas outlet opening is separate from the primary gas outlet opening and forms part of the means for removing gas, and wherein the means for removing and guiding liquid-enriched fluid is arranged to admit all liquid-enriched fluid downwardly into the free inner space.

The present invention is based on the insight that the free inner space between the primary separation devices can be used for a more efficient separation of the liquid-enriched fluid leaving the primary separator(s). Whereas in the prior art the free inner space is merely used to settle out large droplets of bulk liquid from the liquid-enriched fluid so that relatively wet secondary gas is obtained, the tray of the present invention is arranged such that the free inner space is also used to remove entrained liquid from the secondary gas. This is achieved in that the means for removing and guiding liquid-enriched fluid is arranged to admit the fluid downwardly into the free inner space. It was found that in this way under practical operating conditions secondary gas is obtained that is sufficiently free from entrained liquid. The secondary gas therefore does not need to be guided to above the upper wall to reach a secondary gas collecting space or secondary separation means, which results in a more compact and simpler arrangement than known from the prior art. The liquid content of the primary gas is normally sufficiently low, therefore the primary gas is not guided into the free inner space but removed directly through separate outlets in the upper wall.

Without wishing to be bound by the following explanation, Applicant believes that the downward admission has several positive effects on the separation efficiency of the free inner space. On the one hand, the secondary gas, which will ultimately rise in the free inner space, is forced by the downward injection to flow along a curved trajectory, thereby maximising the shortest flow path length that the secondary gas must travel through the free inner space. On the other hand, liquid cannot reach the secondary gas outlets in the upper part of the free inner space on a direct trajectory. Preventing a shortcut for both liquid and secondary gas to the secondary gas outlets maximises the use of the available free inner space, so that all liquid-enriched fluid can reach an area in the free inner space wherein the overall flow velocity is relatively low, and suitably this is the lower region of the free inner space. In this way, the time available for separation of entrained liquid is increased, so that droplets of entrained liquid can separate from the secondary gas, that are much smaller than the bulk liquid droplets of the liquid-enriched fluid. Preferably, secondary gas is obtained which has about the same low liquid content as primary gas.

Suitably, the means for removing and guiding the liquid-enriched fluid to the free inner space has its outlet at a position within 50%, more preferably within 30% of the spacing between upper and lower walls, counted from the lower wall. In this way a sufficiently long travel distance for all of the secondary gas to outlets in the upper region of the free inner space is arranged, so that the residence time of the gas in the free inner space is above a certain minimum to allow settling out of the entrained liquid.

Figure 6:
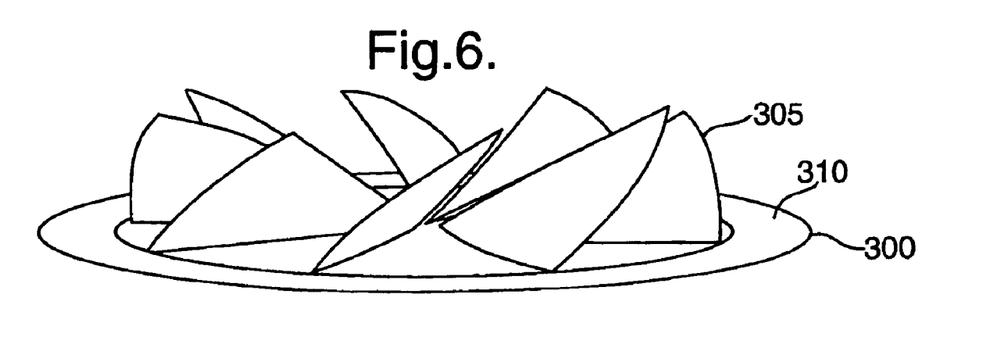
FIG. 6 shows a perspective side view of the swirl imparting means of FIG. 5.

It is observed that European patent application with publication No. EP 0048508 A discloses in FIGS. 6 and 7 a tray with a regular arrangement of swirl tubes. Between adjacent swirl tubes, skirts are arranged that are attached to the upper wall of the tray. Swirl tubes in the centre of the tray are surrounded by four skirts. In each upper wall portion defined by four such skirts an outlet for secondary gas is arranged. There is no secondary separation means for removing entrained liquid from secondary gas in the known tray. The skirts serve to prevent that liquid discharged from a swirl tube will hamper the liquid discharge from an adjacent swirl tube. During operation, liquid-enriched fluid leaves the swirl tubes through tangential openings, to enter the free inner space generally laterally. Secondary gas can then leave the free inner space upwardly through the nearest secondary gas outlet tube, carrying entrained liquid along. Swirl tubes at the circumference of the tray are not fully surrounded by skirts, and the skirts allow for lateral fluid communication in the free inner space near the circumference.

The invention will now be described by way of example in more detail, with reference to the drawings, wherein.

Figure 1:
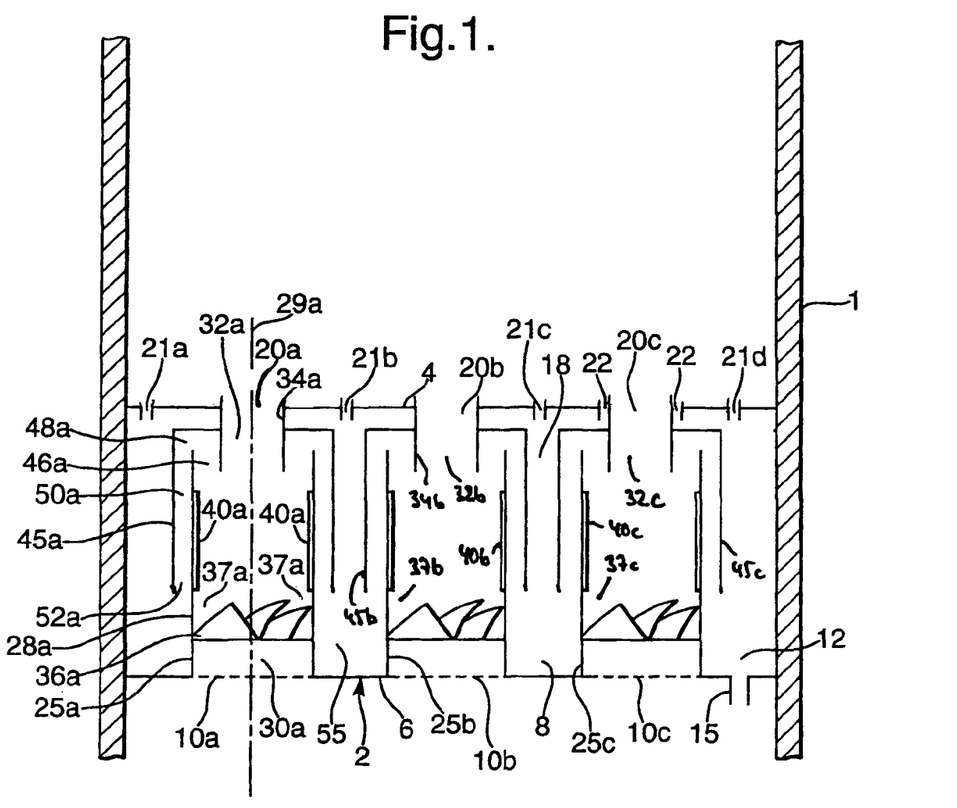
FIG. 1 shows schematically a first embodiment of the invention in cross section.

Reference is made to FIG. 1, showing a column 1 wherein a separation tray 2 according to the present invention is mounted. The separation tray 2 is shown generally horizontally oriented in the vertical column 1, which is the normal orientation when the column 1 shall be operated.

Upper plate 4 and lower plate 6 form the upper and lower walls of the separation tray 2, and define the inner space 8 between them. The lower plate 6 is provided with means for admitting fluid to the inner space 8 in the form of openings 10a, b, c, and with means for removing liquid from the lower part 12 of the inner space 8 in the form of drainage conduit 15. The upper plate 4 is provided with means for removing gas from the upper part 18 of the inner space 8 in the form of outlets 20a, b, c; 21a, b, c, d; and 22.

FIG. 1 shows further in the inner space 8 three primary separation devices for separating fluid into primary gas and liquid-enriched fluid, in the form of swirl tubes 25a, b, c. The swirl tubes are arranged within the inner space 8. Depending on the practical application a separation tray according to the invention can comprise as little as one swirl tube, but also any plurality of swirl tubes, e.g. as many as several hundred or even a few thousand. It shall be clear that an inlet part of a swirl tube can possibly extend below the lower plate 6.

Swirl tube 25a comprises a cylindrical vertical tubular conduit 28a having an axis 29a. The conduit 28a has at its upstream end (normally the lower end) an inlet for fluid 30a, which inlet is in fluid communication with the opening 10a, and at its downstream end (normally the upper end) an outlet for primary gas 32a, which is in fluid communication with the outlet 20a via primary gas outlet conduit 34a, which is preferably co-axial with the tubular conduit 28a. The conduit 34a extends some distance into the conduit 28a.

In the lower part of the conduit 28a a swirl-imparting means 36a is arranged. The swirl imparting means suitably has the form of a vane assembly, preferably of the form which will be discussed below with reference to FIG. 5. A layer of liquid-enriched fluid will flow in an annular region 37a downstream of the swirl-imparting means 36a.

The means for removing and guiding liquid-enriched fluid from the primary separator will now be described. The wall of the tubular conduit 30a is provided with outlet openings 40a, suitably in the form of slits such as vertical or inclined slits. These openings form inlets of the means for removing and guiding liquid enriched fluid.

A cap-like return skirt 45a extends concentrically over the upper part of conduit 28a, with a somewhat larger diameter than the conduit 28a. The primary gas outlet conduit 34a extends through the upper end of the return skirt 45a, wherein the return skirt sealingly engages the conduit 34a so that fluid from the annular region 46a between the lower end of the primary gas outlet conduit 34a and the upper end of conduit 28a cannot leave the swirl tube 25a in upward direction. An annular opening 48a forms a further inlet of the means for removing and guiding liquid-enriched fluid, and allows fluid from the annular region 46a to flow into the outer annular region 50a between the conduit 28a and the return skirt 45a. At its lower end the return skirt extends over the outlets 40a, and forms with the conduit 28a an annular outlet 52a into the free inner space 55 of the separation tray 2. The free inner space 55 is formed by the part of the inner space between the plates 4 and 6, that is downstream of the outlets 52a and the respective annular outlets of the other swirl tubes.

The swirl tubes 25b and 25c have substantially the same form as swirl tube 25a.

During normal operation of the separation tray 2, a gas/liquid fluid mixture is admitted from below the lower plate 6 to enter the primary separation devices, swirl tubes 25a, b, c. The swirl-imparting means 36a imparts a rotary movement to the gas/liquid mixture, and by this rotary movement the liquid droplets of the gas/liquid mixture are flung outwardly. Relatively liquid-free gas continues to flow in the axial region above, i.e. downstream of the swirl imparting means, and leaves the swirl tube as primary gas through the co-axial conduit 34a to above the separation tray.

In the annular region 37a downstream of the swirl-imparting means 36a, a layer of liquid-enriched fluid is formed. Liquid droplets can impinge on the inner wall of the conduit 28a and form a streaming layer of liquid. Secondary gas will also stream upwardly in this annular region and liquid can also be re-entrained in the gas. Liquid-enriched fluid is removed from the annular region 37a via the outlets 40a and 48a, and guided downwardly by the return skirt 45a to enter the free inner space 55 via annular outlet 52a in downward direction.

Large liquid droplets will immediately settle in the lower part of the free inner space to form a liquid layer on top of the lower plate. Liquid is -removed from this layer via drainage conduit 15. Secondary gas leaving the outlet 52a is admitted directly to the lower region of the free inner space wherein the distance between swirl tubes is largest. Therefore, flow velocities are low enough to allow liquid entrained in the gas to coalesce and settle into the liquid layer. Also while secondary gas flows further upwardly in the free inner space 55, further settling out of entrained liquid can take place. The relatively liquid-free secondary gas leaves the free inner space through outlets in the upper plate 4, which can for example be arranged between swirl tubes as shown with reference numeral 21a, b, c, d. Another possibility is to arrange secondary gas outlets annularly around the primary gas outlet conduits, as shown with reference numeral 22.

Most of the liquid will leave the swirl tube conduit 28a at the lower end of the slits 40a, and the concentration of gas in the liquid-enriched fluid leaving the conduit further downstream through the upper end of the slits and through the annular opening 48a will be higher. At high flow velocities it can happen that liquid being expelled through the lower end of the slits 40a and impinging on the inner wall of the return skirt 45a will to some degree be re-entrained in the secondary gas streaming downward in the annular region 50a. It has been found, however, that under practical operating conditions the increased efficiency of separation in the free inner space overcompensates this effect so that the net effect is positive and sufficiently dry secondary gas is produced.

Figure 2:
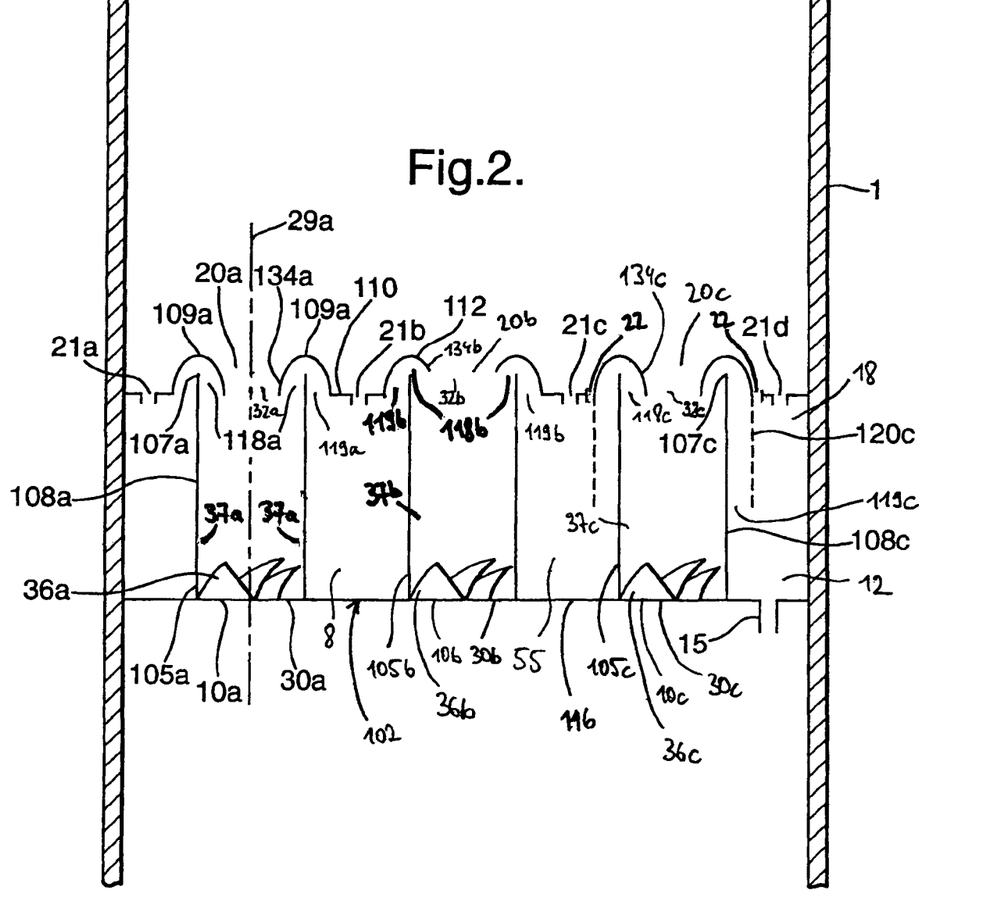
FIG. 2 shows a schematically second embodiment of the invention in cross section.

Reference is now made to FIG. 2, showing schematically a second embodiment of a separation tray 102 according to the invention. Parts that are substantially similar to the tray 2 of FIG. 1 are referred to with the same reference numerals.

The primary separation devices are shown as swirl tubes 105a, b, c. As an example, swirl tube 105a will be discussed in more detail. The other swirl tubes are similar. The cylindrical vertical tubular conduit 108a, which is not provided with openings in its side wall. Over the upper end 107a of the conduit 108a an annular U-shaped return skirt 109a is arranged, suitably co-axially with the swirl tube 105a. The radially inner part of the return skirt 109a forms in this embodiment the primary gas outlet conduit 134a extending from the primary gas outlet 32a of the swirl tube 105a to the outlet 20a. Primary gas thus does not enter the free inner space 55 of the tray 102. The return skirt in this embodiment is integrated with the upper plate 110 to form the upper wall 112. An outlet for fluid from the annular region 115a between the lower end of the primary gas outlet conduit 134a and the upper end 107a of the conduit 108a is formed by the annular opening 118a between the upper end of conduit 108a and the return skirt 109a (upper wall 112). The annular opening 118a forms an inlet for the means for removing and guiding liquid-enriched fluid from the primary separation device, and the outer annular opening 119a between the upper end of conduit 108a and the return skirt 109a forms an outlet for this means. The free inner space 55 is formed by the space between the walls 112 and 116, downstream of the outlets 119a, b, c.

Suitably, the downstream end of the return skirt extends from the upper end of the conduit 108a downwardly to a position that is at least 10% of the length of the tubular conduit 108a closer to the lower plate. The length of the tubular conduit can be regarded as a measure for the spacing between the upper wall 112 and the lower wall 116. If needed, to prevent a shortcut of secondary gas to the secondary gas outlets, the return skirt can also extend further downwardly into the inner space 8, as indicated with reference numeral 120c for swirl tube 105c, so that the outlet 119c admits the liquid-enriched fluid further downwardly into the free inner space 55. In this case, the upper end 107c of conduit 108c of swirl tube 105c can be approximately in the plane of upper plate 110.

The inlet end of the return skirt can be arranged such that its inlet opening for liquid-enriched fluid is arranged above its outlet opening, and in particular the inlet opening can be arranged at the level of the upper end of the swirl tube or above. This option is indicated for swirl tube 105b where the return skirt formed by the upper wall 112 extends to just above the upper end of the swirl tube 105, so that an annular inlet opening 118b is formed at a higher position than shown for the swirl tubes 118a,c.

The swirl-imparting means 36a of this embodiment is shown integrated with the lower wall 116. The embodiment of FIG. 2 allows a particularly compact design and cost-effective production.

Normal operation of the separation tray 102 of this embodiment is generally similar to that of tray 2 in FIG. 1. A gas/liquid mixture enters into the primary separation devices, for example swirl tube 105a, from below. The swirl-imparting means causes a layer of liquid-enriched fluid to be formed in the annular region 37a, as described with reference to FIG. 1. Relatively liquid-free primary gas leaves the separation tray 102 through the preferably co-axial primary gas outlet conduits 20a, b, c. The liquid-enriched fluid comprising liquid and secondary gas is removed from the conduit 108a a through the opening 118a and guided downwardly by the return skirt to enter the free inner space 55 in downward direction. The bulk of liquid will settle to form a liquid layer on the plate 116, which is removed through outlet 15. The secondary gas will due to its momentum also continue to flow in downward direction, thereby making use of a large part of the free inner space 55 so that the residence time of the secondary gas in the free inner space is long enough for the entrained liquid to settle out. Separate secondary gas outlets 21*a, b, c, d* are preferably arranged as far as possible away from the return skirts, see the discussion of FIGS. 3 and 4 below. Alternatively, annular secondary gas outlets as shown with reference numeral 22 for swirl tube 105*c* can be arranged.

Figure 3:
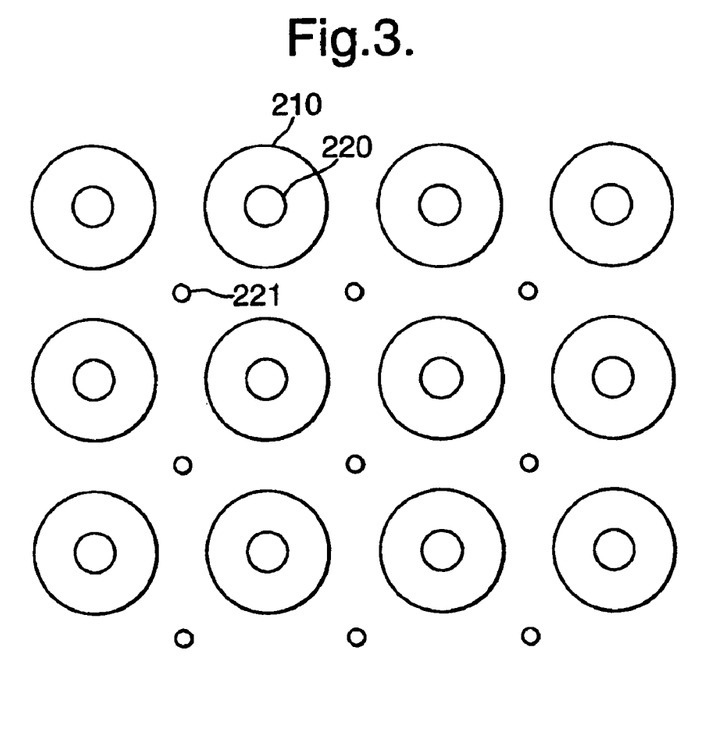
FIG. 3 shows schematically a first arrangement of swirl tubes on a separation tray according to the invention.
Figure 4:
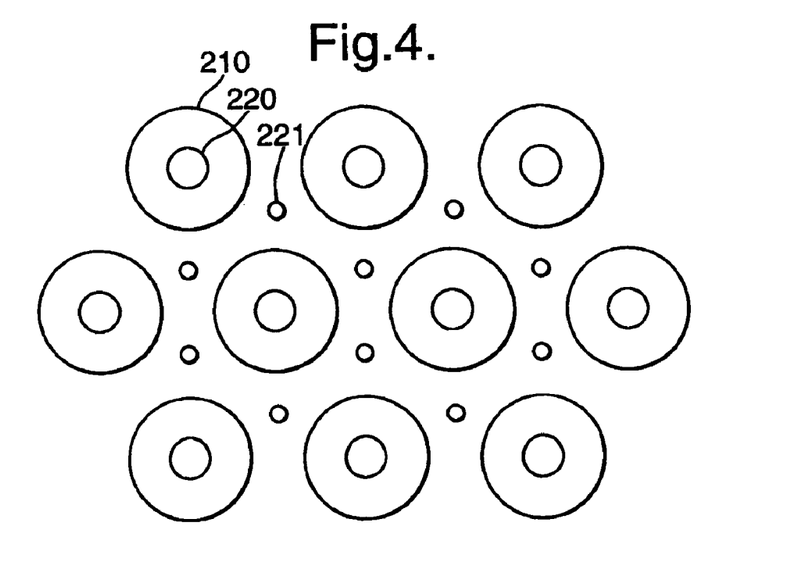
FIG. 4 shows schematically a second arrangement of swirl tubes on a separation tray according to the invention.

Reference is now made to FIGS. 3 and 4 showing schematically a top view of two different arrangements for swirl tubes and separate secondary gas outlet openings on a separation tray. Only the outer circumference of the return skirts 210, primary gas outlets 220 and secondary gas outlets 221 are shown, wherein for the sake of clarity a reference numeral is only given to one of each of these components. In the arrangement of FIG. 3, each swirl tube is arranged on a corner of a virtual regular grid with quadratic cells. When secondary gas outlets are arranged symmetrically in between 4 neighbouring swirl tubes, they have the largest distance from the return skirts. Also, in this arrangement there is a substantial amount of free inner space underneath the secondary gas outlets. In the arrangement of FIG. 4, each swirl tube is arranged on a corner of a virtual regular grid wherein the cells are equilateral triangles, so that each swirl tube has 6 nearest neighbours. The swirl tubes can be placed closer to each other as compared to the arrangement of FIG. 3, however in this way the secondary gas outlets are closer to the return skirts and there is less free inner space available underneath the secondary gas outlets.

Figure 5:
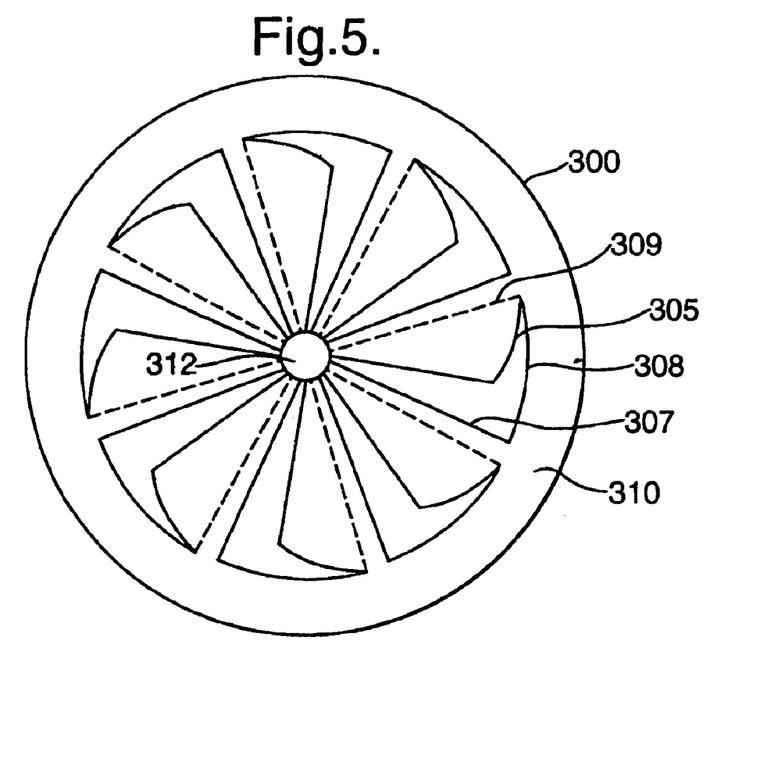
FIG. 5 shows a schematic top view of a swirl imparting means suitable for use with the present invention.

Reference is now made to FIGS. 5 and 6 showing a top view and a perspective side view of a swirl imparting means 300 suitable for use with the present invention. The swirl-imparting means is formed by vanes 305, which are integrally formed from a metal plate 310. Each of the eight vanes 305 of the shown embodiment has substantially the form of a circle segment. Such a vane can easily be produced by providing suitably arranged radial cuts 307 and circular arched cuts 308 around a centre 312 as shown in FIG. 5, followed by bending of each of the partially cut-out circular segments about a radius 309, out of the plane of the metal plate. For the sake of clarity, reference numerals have only be given for one of the segments.

The term cutting is used to refer to any suitable way to arrange slits into a plate, so as to define segments that can be bent. From a manufacturing point of view, suitable ways of providing the cuts include punching and stamping, and particularly suitable is it to arrange the cuts by means of a laser.

As becomes apparent from FIG. 5, after bending of the vanes the swirl imparting means is not optically closed in top view. It was found that good swirl impartation and thereby good separation performance can be obtained when mounted in a swirl tube. Suitably, 4-12 vanes are arranged. Preferably all vanes are bent into the same direction, out of the plane of the metal plate in the direction of fluid flow during normal operation. The bend angle between vanes and the metal plate can be between 10 and 60 degrees, and should be optimised for a particular application. Good results were obtained with angles between 25 and 40 degrees.

The metal plate from which the swirl imparting means is manufactured can be a circular plate 310 as shown in FIGS. 5 and 6. The outer rim can be attached, e.g. spot-welded, to into the swirl tube, e.g. into conduit 28*a* in FIG. 1. Alternatively, the outer rim can also be directly attached to the lower wall of the separation tray. A further possibility is to integrate the swirl imparting means with the lower wall. Lower plate 116 in FIG. 2 indicates such swirl-imparting means 36*a, b, c* which have been arranged by cutting and bending vanes directly from the lower plate 116. The latter possibility allows a particularly efficient production of a separation tray of the present invention, since less individual components need to be handled.

The separation tray according to the present invention can for example be applied in a compact high-efficiency separation column having as main internals a fluid inlet device arranged to introduce fluid comprising liquid and gas at a first vertical position or interval, and wherein the separation tray is arranged above the first position or interval. Outlets for gas and liquid from the column are suitably arranged in the top and bottom parts of the column, respectively. A suitable fluid inlet device is for example disclosed in the British patent specification GB 1 119 699.

For some applications it may be desired to arrange several of the trays according to the present invention in a column, vertically spaced apart.

The separation tray of the present invention can with advantage be used in applications wherein gas/liquid separation at high pressures (e.g. 50 bar or higher) is to be performed. For example, in the production of natural gas from underground gas reservoirs through gas production wells, the present invention can be used for gas/condensate or gas/water separation. The present invention provides for a compact and efficient separation tray, which allows to minimise the size of the high pressure column wherein it is installed.

Test experiments have been performed using a separator including a single swirl tube, generally like the swirl tube as described with reference numeral 25*a* with reference to FIG. 1. The swirl tube was co-axially arranged in a vertically disposed circle cylindrical chamber of 300 mm diameter and 500 mm height, the chamber having top and bottom plates. The swirl tube was formed by a cylindrical swirl tube conduit of 110 mm diameter and 400 mm length, extending from its inlet in the lower plate of the chamber to its upper end in the chamber. At the inlet a swirl imparting means as discussed with reference to FIGS. 5 and 6 was arranged. The conduit was provided with four longitudinal slits of 260 mm length and 2 mm width, arranged symmetrically around the circumference of the swirl tube conduit. The upper end of the slits was spaced 40 mm from the upper end of the swirl tube conduit. Over the upper end of the conduit a co-axial cap-like return skirt was arranged, which was formed by a cylindrical return skirt conduit of 140 mm diameter, closed at its upper end by a horizontal plate. The horizontal plate was placed at 2 mm vertical distance from the upper end of the swirl tube conduit, thereby forming an annular opening. A co-axial primary gas outlet conduit of 50 mm diameter extended from a position between the upper end of the longitudinal slits and the upper end of the swirl tube conduit, upwardly through the horizontal plate of the return skirt and the upper plate of the chamber. In the upper plate of the chamber, four outlets for secondary gas from the free space in the chamber, outside the swirl tube and return skirt were arranged. By adjusting the size of the secondary gas outlets, the amount of secondary gas produced could be varied. In the lower plate of the chamber, two outlet conduits for liquid from the free inner space of the chamber were arranged.

Experiments were carried out to separate a fluid, which was a mixture of triethylene glycol (liquid) and air, at ambient conditions. The mixtures as admitted to the inlet of the swirl tube contained between 0 and 400 kg/hour liquid and between 250 and 800 m$^3$/hour gas. At 550 m$^3$/hour gas flow rate, and without liquid, a dry pressure drop of 10 mbar was measured. It was found that the primary entrainment was in the order of 1% or better over the full range of gas and liquid flow rates, when the secondary gas outlets were adjusted such that about 20% or more of the total gas left the separator as secondary gas. Primary entrainment is defined as the fraction of the total liquid flow that leaves the separator as entrained liquid with primary gas through the primary gas outlet conduit.

I claim:

1. A compact high-efficiency separation column containing a plurality of vertically spaced apart separation trays, each of said plurality of separation trays comprising a normally horizontal upper wall and a normally horizontal lower wall defining an inner space between them; a means for admitting fluid to the inner space; a means for removing liquid from the inner space; a means for removing gas from the inner space; a plurality of primary separation devices within the inner space, for separating fluid into primary gas and liquid-enriched fluid, which primary separation devices comprise:

a normally vertical tubular conduit having at its lower end an inlet for fluid, which inlet is in fluid communication with the means for admitting fluid, and having at its upper end an outlet for primary gas, from which outlet an outlet conduit extends to a primary gas outlet opening in the upper wall, which primary gas outlet opening forms part of the means for removing gas;

a swirl-imparting means arranged in the conduit between the inlet for fluid and the outlet for primary gas, so as to cause, during normal operation, the formation of a layer of liquid-enriched fluid in an annular region adjacent the inner surface of the conduit downstream of the swirl-imparting means, which liquid-enriched fluid comprises secondary gas;

and which separation tray further comprises a means for removing and guiding liquid-enriched fluid from each of the primary separation devices to a secondary separation means for removing entrained liquid from the secondary gas, wherein the secondary separation means for removing entrained liquid from secondary gas is formed by the free inner space between the upper and lower walls, which free inner space has in its lower part an outlet for liquid in fluid communication with the means for removing liquid and in its upper part a plurality of outlets for secondary gas, which extends to a plurality of secondary gas outlet openings in the upper wall, which secondary gas outlet openings are located above said means for removing and guiding liquid-enriched fluid and are separate from the primary gas outlet opening and forms part of the means for removing gas, at least one of which secondary gas outlet openings is arranged annularly around a primary gas outlet, and wherein the means for removing and guiding liquid-enriched fluid entirely surrounds the uppermost end of each conduit of each primary separation device and is arranged to admit all liquid-enriched fluid downwardly into the free inner space at a position within 30% of the spacing between upper and lower walls, counted from the lower wall, along a curved trajectory at a velocity such that the entrained liquid in the liquid-enriched fluid is separated from the secondary gas to about the same low liquid content as the primary gas.

2. The compact high-efficiency separation column according to claim 1, wherein an inlet of the means for removing and guiding liquid is formed by at least one opening in the wall of the tubular conduit of the primary separation devices, downstream of the swirl-imparting means, and wherein the means for removing and guiding liquid-enriched fluid comprises a return skirt arranged externally over the upper part of the conduit.

3. The compact high-efficiency separation column according to claim 2, wherein a further inlet of the means for removing and guiding liquid-enriched fluid is formed by an annular opening between the upper end of the tubular conduit and the return skirt.

4. The compact high-efficiency separation column according to claim 1, wherein the means for removing and guiding liquid-enriched fluid has an inlet at the upper end of the conduit of the primary separation devices, and is arranged to admit the liquid-enriched fluid into the free inner space at a position closer to the lower wall by at least 10% of the length of the conduit, counted from the inlet at the upper end of the conduit.

5. The compact high-efficiency separation column according to claim 4, wherein the means for removing and guiding liquid-enriched fluid is formed by a return skirt that is formed integrally with the upper wall.

6. The compact high-efficiency separation column according to claim 5, wherein separate outlets for primary and secondary gas are arranged in the upper wall.

7. The compact high-efficiency separation column according to claim 6 and provided with a return skirt, wherein the return skirt is annularly U-shaped.

8. The compact high-efficiency separation column according to claim 7, wherein the swirl-imparting means is formed from a metal plate by providing the metal plate with slits so as to define segments, followed by bending the segments out of the plane of the metal plate.

9. The compact high-efficiency separation column according to claim 8, wherein the each segment has the form of a circle sector, and is bent around a radius out of the plane of the metal plate.

10. The compact high-efficiency separation column according to claim 9, wherein the slits are provided by means of laser cutting.

11. The compact high-efficiency separation column according to claim 10, wherein the swirl imparting means is integrally formed with the bottom wall.

12. The compact high-efficiency separation column according to claim 11, wherein a plurality of primary separation devices is arranged on the corners of a regular grid, in particular a grid formed by quadratic cells or equilateral triangular cells.

13. The compact high-efficiency separation column according to claim 6, wherein at least one secondary gas outlet is arranged annularly around a primary gas outlet conduit and is located above the return skirt.

14. The compact high-efficiency separation column according to claim 1, further characterized by the absence of means to restore linear flow to the primary gas in the primary gas outlet conduit downstream of the swirl-imparting means.

15. A process of separating natural gas/condensate in the production of natural gas employing the compact high-efficiency separation column of claim 1, which column contains a plurality of vertically spaced apart separation trays, each of which comprises a normally horizontal upper wall and a normally horizontal lower wall and a plurality of primary separation devices defining between them an inner space, said process comprising the steps of:

passing a mixture of natural gas and entrained liquid condensate into said plurality of primary separation devices wherein said mixture is separated into natural gas substantially free of entrained liquid condensate and a liquid-enriched mixture of natural gas and liquid condensate;

admitting all of said liquid-enriched mixture of natural gas and liquid condensate downwardly into said inner space through means for removing and guiding liquid-enriched fluid, which means surrounds each of said primary separation devices, wherein said liquid-enriched fluid flows along a curved trajectory in said inner space at a velocity such that the entrained liquid condensate is separated from the natural gas to about the same low condensate level as the condensate level in the natural gas separated in the primary separation devices;

recovering from the said inner space natural as having about the same low condensate level as the natural gas from the primary separation devices.

16. A process according to claim 15, wherein the product separated from natural gas is water.

17. A process according to claim 15, wherein the natural gas/condensate is separated at pressures of 50 bar or higher.

* * * * *